US009756539B2

(12) United States Patent
Lee et al.

(10) Patent No.: US 9,756,539 B2
(45) Date of Patent: Sep. 5, 2017

(54) METHOD AND APPARATUS FOR HANDOVER IN COMMUNICATION SYSTEM

(71) Applicant: Samsung Electronics Co., Ltd., Suwon-si, Gyeonggi-do (KR)

(72) Inventors: Ok-Seon Lee, Suwon-si (KR); Jung-Shin Park, Seoul (KR); Yeong-Moon Son, Yongin-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 14/297,017

(22) Filed: Jun. 5, 2014

(65) Prior Publication Data
US 2014/0364128 A1    Dec. 11, 2014

(30) Foreign Application Priority Data
Jun. 5, 2013 (KR) ........................ 10-2013-0064657

(51) Int. Cl.
*H04W 36/00* (2009.01)
*H04W 36/18* (2009.01)
*H04W 36/04* (2009.01)
*H04W 48/12* (2009.01)

(52) U.S. Cl.
CPC ............ *H04W 36/18* (2013.01); *H04W 36/04* (2013.01); *H04W 48/12* (2013.01)

(58) Field of Classification Search
CPC ............. H04W 36/00; H04W 36/0005; H04W 36/0016; H04W 36/0011; H04W 36/0083

USPC ........... 455/414.1, 436, 437, 438, 439, 442, 455/452.2, 445
See application file for complete search history.

(56) References Cited

U.S. PATENT DOCUMENTS

| 7,512,403 | B2 * | 3/2009 | Rajkotia | H04W 36/32 370/311 |
| 7,925,263 | B2 | 4/2011 | Zaki | |
| 2006/0240829 | A1 * | 10/2006 | Hurst | H04W 36/0083 455/436 |
| 2007/0015511 | A1 * | 1/2007 | Kwun | H04W 36/30 455/436 |
| 2010/0309782 | A1 * | 12/2010 | Lee | H04W 48/16 370/229 |
| 2011/0268085 | A1 | 11/2011 | Barany et al. | |
| 2012/0309394 | A1 * | 12/2012 | Radulescu | H04W 36/0055 455/436 |
| 2014/0169201 | A1 * | 6/2014 | Tamura | H04L 5/0037 370/252 |

(Continued)

FOREIGN PATENT DOCUMENTS

KR    10-2006-0033843 A    4/2006
KR    10-2009-0088704 A    8/2009

*Primary Examiner* — Jean Gelin
(74) *Attorney, Agent, or Firm* — Jefferson IP Law, LLP

(57) ABSTRACT

A method for a serving base station to determine a handover time in a communication system is provided. The method includes determining whether to set up dual connectivity (DC) with respect to a terminal with a target base station that transmits the beacon if it is recognized that the terminal receives a beacon including a plurality of pieces of service coverage area information, and determining whether to execute a handover to the target base station based on a measurement report of the terminal, which is received after the DC is set up if the DC is set up.

20 Claims, 12 Drawing Sheets

(56) References Cited

U.S. PATENT DOCUMENTS

| | | | | |
|---|---|---|---|---|
| 2014/0187247 A1* | 7/2014 | Sarkar | .................. | H04W 36/30 |
| | | | | 455/437 |
| 2014/0335858 A1* | 11/2014 | Lee | .................. | H04W 52/0206 |
| | | | | 455/434 |
| 2015/0139195 A1* | 5/2015 | Xiao | .................... | H04W 36/22 |
| | | | | 370/332 |

* cited by examiner

METHOD AND APPARATUS FOR HANDOVER IN COMMUNICATION SYSTEM

CROSS-REFERENCE TO RELATED APPLICATION(S)

This application claims the benefit under 35 U.S.C. §119 (a) of a Korean patent application filed on Jun. 5, 2013 in the Korean Intellectual Property Office and assigned Serial number 10-2013-0064657, the entire disclosure of which is hereby incorporated by reference.

TECHNICAL FIELD

The present disclosure relates to a handover method and apparatus in a communication system.

BACKGROUND

In a related-art communication system, when a handover caused by movement of a mobile station (MS) is executed, a target base station (BS) to which the MS is to be handed over and a handover time are determined based on a channel environment-related report associated with a neighboring base station that a serving BS receives from the MS.

However, the connection between the MS and the serving BS may be disconnected in a radio shadow zone, before the serving BS transmits a handover command to the MS. In this instance, handover operations of the serving BS may not be smoothly executed. For example, in the case of a millimeter wave system introduced for satisfying the increasing demand of radio data traffic, a degree of a decrease in signal strength is significantly higher than other systems when the signal passes through an obstacle. Accordingly, when an event in which the MS passes through an obstacle, enters inside, or goes into a basement occurs, the connection with the MS may be disconnected before the serving BS determines the target BS to which the MS is to be handed over and an appropriate handover time. In this instance, the MS faces a radio link failure (RLF) situation before recognizing that the MS is out of a service coverage area of the serving BS due to the movement of the MS and should be handed over. When the connection between the MS and a new BS is set up through a related-art RLF overcome process, the service interruption occurring during the RLF overcome process takes longer and the continuity of the service may not be obtained even though the MS attempts to reopen the service that has been provided from the existing serving BS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for determining a handover time in a communication system.

Another aspect of the present disclosure is to provide a method of determining a handover time through reporting of information and communication between a serving base station (BS) and the target BS when a mobile station (MS) is located in a radio shadow zone in a communication system including a plurality of service coverage areas.

In accordance with an aspect of the present disclosure, a handover method of a serving base station in a communication system is provided. The method includes if it is recognized that a terminal receives a beacon including a plurality of pieces of service coverage area information, determining setup of dual connectivity (DC) with respect to the terminal with a target base station that transmits the beacon, and, if the DC is set up, determining whether to execute a handover to the target base station based on a measurement report of the terminal which is received after the DC is set up.

In accordance with another aspect of the present disclosure, a handover method of a target base station in a communication system is provided. The method includes in a state where the target base station that supports a plurality of service coverage areas has dual DC set with a serving base station of a terminal and the terminal, receiving from the terminal, a measurement report associated with a beacon of the target base station, and, determining whether to execute a handover of the terminal based on the measurement report.

In accordance with another aspect of the present disclosure, a handover method of a terminal in a communication system is provided. The method includes if a beacon transmitted by a target base station that provides a plurality of service coverage areas is received, transmitting beacon-related information to a serving base station, receiving, from the serving base station, information for DC with the target base station, and, transmitting a measurement report corresponding to a coming period to the serving base station and the target base station based on the information for the DC.

In accordance with another aspect of the present disclosure, a serving base station that executes a handover in a communication system is provided. The serving base station includes a controller configured to determine setup of DC with a target base station that transmits the beacon to the terminal if it is recognized that a terminal receives a beacon including a plurality of pieces of service coverage area information, and if the DC is set up, to determines whether to execute a handover to the target base station based on a measurement report of the terminal which is received after the DC is set up.

In accordance with another aspect of the present disclosure, a target base station that executes a handover in a communication system is provided. The target base station includes a receiving unit configured to receive, from a terminal, a measurement report associated with a beacon of the target base station in a state where the target base station that supports a plurality of service coverage areas has DC set with a serving base station of the terminal and the terminal, and, a controller configured to determine whether to execute a handover of the terminal based on the measurement report.

In accordance with another aspect of the present disclosure, a terminal that executes a handover in a communication system is provided. The terminal includes a controller configured to control a transceiving unit to transmit beacon-related information to a serving base station if the terminal receives a beacon transmitted by a target base station that provides a plurality of service coverage areas, to receive, from the serving base station, information for DC with the target base station, and to transmit a measurement report corresponding to a coming period, to the serving base station and the target base station, based on the information for the DC.

According to the present disclosure, if a MS receives a beacon of a service coverage area that is capable of supporting a quality of service (QoS) used by the MS, DC with a target BS that transmits the beacon is set up, and a handover time is adjusted by adjusting a period of a measurement report based on a signal strength of the beacon associated with the target BS. Therefore, the present disclosure may provide the continuity of a service of a terminal and may support QoS even if signal strength decreases significantly due to an obstacle based on a characteristic of a high frequency band, and even if the terminal is located in a radio shadow zone of other different frequency bands.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
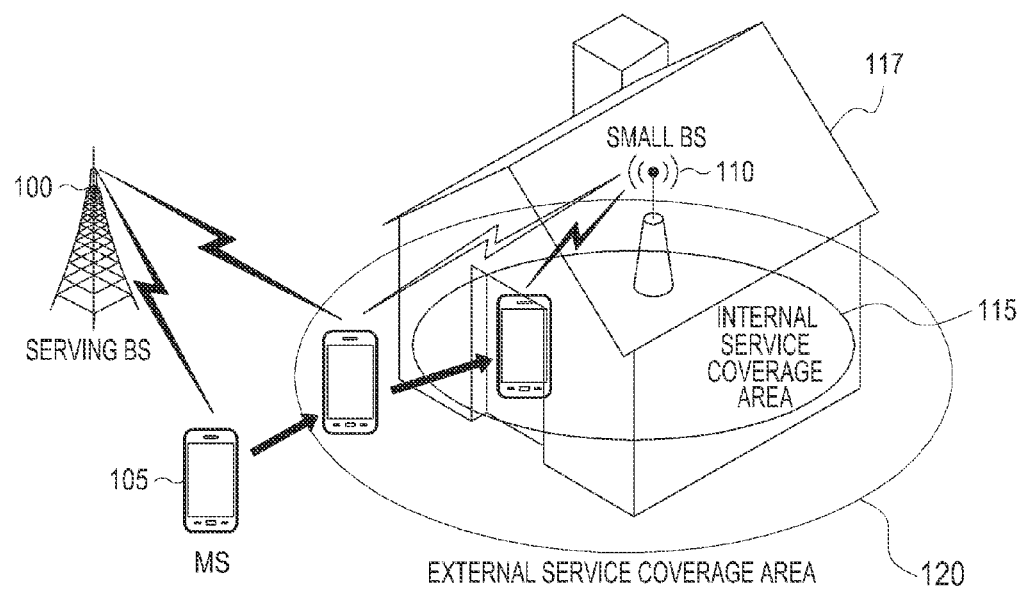
FIG. 1 is a diagram illustrating an example of a movement of a Mobile Station (MS) in a communication system including a plurality of service coverage areas according to an embodiment of the present disclosure.

FIG. 1 is a diagram illustrating an example of a movement of a mobile station (MS) in a communication system including a plurality of service coverage areas according to an embodiment of the present disclosure.

Referring to FIG. 1, for example, when the case of a millimeter wave communication system is assumed, a small base station (BS) 110 may be installed to reduce service interruption caused by a radio shadow zone, which is the result of the loss of signal strength due to an obstacle, or the like. Accordingly, the communication system includes a serving base station (BS) 100 and the small BS 110 and thus, each BS transmits a beacon having a different service coverage area. For example, the serving BS 100 may correspond to a $3^{rd}$ generation partnership project (3GPP) pico base station (BS), a millimeter wave pico BS, and the like. The small BS 110 may correspond to a wireless local area network (LAN) or the like that is installed to be integrated into the serving BS 100. In this instance, a beacon transmitted by the small BS 110 may include a field that indicates the small BS 110 is a BS integrated into the serving BS 100. The serving BS 100 may receive a result of reception of the beacon from an MS 105, and may use the result in a process of determining a handover.

Here, as an example, it is illustrated that the MS 105 moves to a service coverage area of the small BS 110. The service coverage area of the small BS 110 may be distinguished, based on, for example, a building 117, as an internal service coverage area 115 of an internal area of the building 117 and an external service coverage area 120 of an external area of the building 117. Accordingly, the small BS 110 broadcasts different beacons respectively corresponding to the internal service coverage area 115 and the external service coverage area 120.

As described above, a communication system including a plurality of service coverage areas according to an embodiment of the present disclosure may include, for example, the case that is based on different radio access systems (e.g., radio access technology (RAT)) such as the service BS 100 and the small BS 110 of FIG. 1. In this example, switching an RAT is performed when the MS 105 is handed over between the serving BS 100 and the small BS 110. As another example, the case in which a single communication system operates a plurality of frequency bands and a beacon associated with each frequency band is transmitted may be included. In this example, determination associated with the change of a frequency band may be performed based on resource allocation when an MS is handed over between service coverage areas of the frequency bands.

Figure 2A:
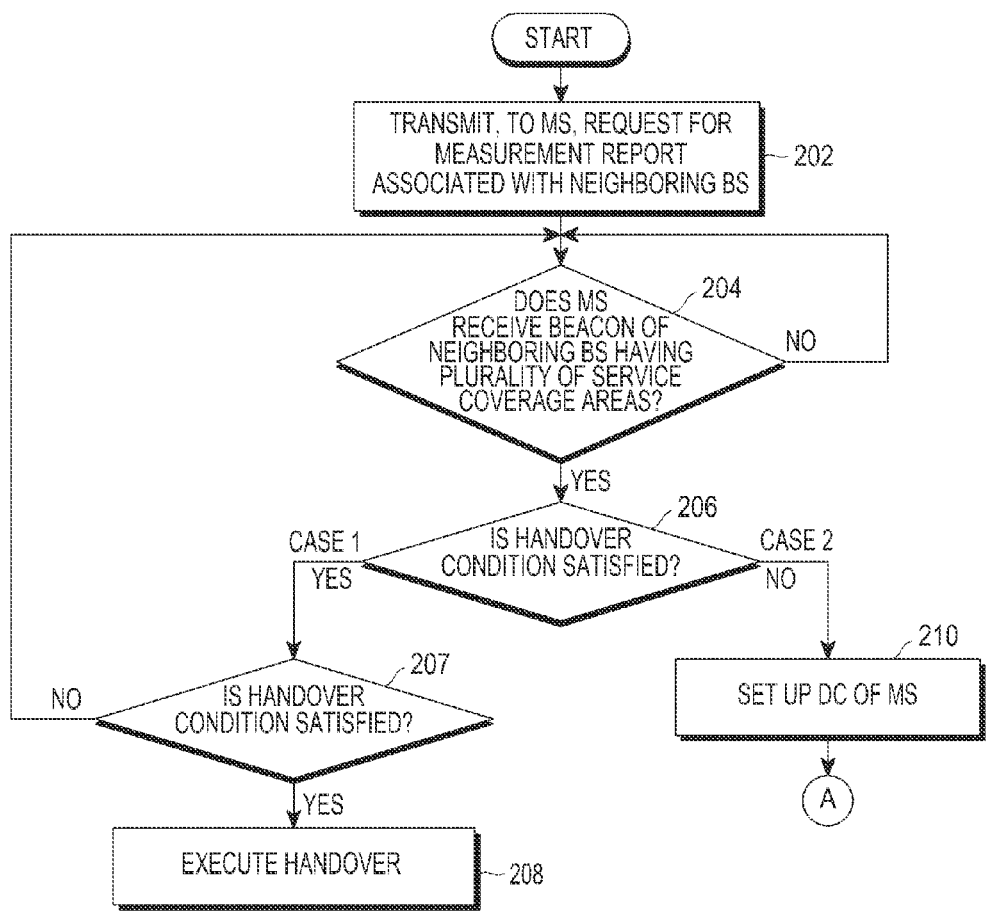
FIGS. 2A and 2B are examples of a flowchart of operations of a serving Base Station (BS) according to an embodiment of the present disclosure.
Figure 2B:
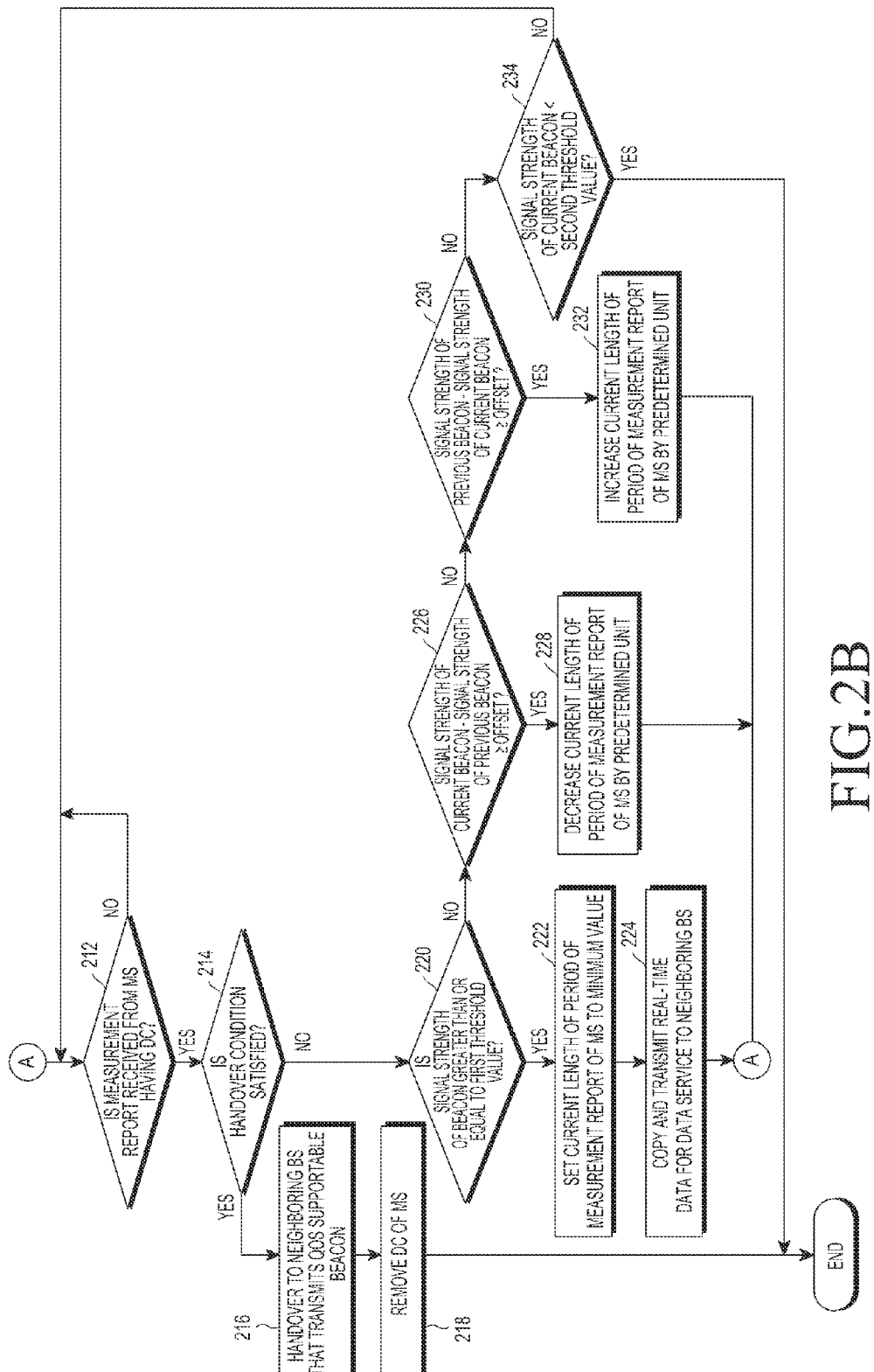

FIGS. 2A and 2B are examples of a flowchart of operations of a serving BS according to an embodiment of the present disclosure. Here, for ease of description, the operations of the serving BS 100 will be described based on the communication system of FIG. 1.

Referring to FIGS. 2A and 2B, the serving BS 100 transmits, to the MS 105, a neighboring BS signal measurement report request in operation 202. When the 'neighboring BS signal measurement report' is received from the MS 105 in operation 204, the serving BS 100 determines whether a target signal of the measurement report corresponds to a beacon of a BS having a plurality of service coverage areas. When the determination shows that it is different from the beacon of the BS having a plurality of service coverage areas, the serving BS waits until a corresponding beacon is received. The determination may be recognized by determining whether a field indicating that a BS, which transmits the beacon is a BS integrated with another BS, exists in the received beacon.

When the determination shows that the field exists and the received beacon corresponds to the beacon of a neighboring BS having a plurality of service coverage areas, the serving BS proceeds with operation 206. In operation 206, the serving BS 100 determines whether a handover condition is satisfied based on the measurement report. Here, the handover condition is set to be the case in which the service coverage area of the received beacon provides a service with a quality of service (QoS) used by the MS. When the determination shows that the service with the QoS used by the MS is provided to the MS in a service coverage area corresponding to the currently received beacon, it is determined that the beacon satisfies the handover condition, and the serving BS 100 proceeds with case 1 and executes a handover. However, when it is determined that the service with the QoS used by the MS is not provided in the service coverage area corresponding to the currently received beacon, the serving BS 100 proceeds with case 2 and determines whether to set up a dual connectivity (DC).

Hereinafter, case 1 and case 2 according to an embodiment of the present disclosure will be described in detail with reference to the signal flow diagrams of FIGS. 4, 5A, and 5B. First, in case 1, the serving BS determines whether a reception strength of a beacon of a neighboring BS is greater than or equal to a handover reference threshold value in operation 207. When the reception strength is less than the handover reference threshold value, the serving BS returns to operation 204 and waits until a beacon of another neighboring BS is received. Here, the handover reference threshold value may be defined to be a minimum threshold value of a signal strength for providing a service to the MS. When the received beacon is greater than or equal to the handover reference threshold value in operation 207, the serving BS 100 executes a handover in operation 208.

When the determination made in operation 206 shows that the received beacon does not satisfy the handover condition, the serving BS 100 determines that the service of the QoS used by the MS may be provided through another service coverage area of the serving BS, and proceeds with operation 210.

In operation 210, the serving BS 100 sets up dual connectivity (DC) with the neighboring BS, based on a signal strength associated with a beacon of the neighboring BS. In the present disclosure, the DC is defined to be the state in which the MS 105 sets up connection with both the serving BS 100 and a target BS for a handover, and is capable of receiving a control signal through both the BSs and is capable of transmitting a report in a determined format to both the BSs. As an example, it is assumed that the serving BS 100 recognizes that the MS has received a beacon of the neighboring BS, that is, a wireless LAN beacon of the small BS 100, through a relatively low frequency band, while having received a service with a high data rate in a frequency band having dozens of GHz, and the beacon is transmitted from the small BS 110, which is a wireless LAN BS integrated with the serving BS 100 which is a millimeter wave BS. In this instance, the serving BS 100 determines to set up DC of the MS 105, and communicates information regarding the DC with the neighboring BS, that is, the target BS, and the MS 105. An example of the information communicated may include the case of applying a time division scheme and distinguishing a time section for communication between the target BS and the MS and a time section for communication between the serving BS and the MS.

According to an embodiment of the present disclosure, the MS for which DC is set up may receive data service through only the serving BS and may transmit, to the target BS, a measurement report corresponding to the communicated information or the format in a corresponding time section, for the QoS used by the MS. In this example, to the measurement report that the MS transmits to the target BS, a simple format may be applied, in comparison to a neighboring BS search report. In particular, information indicating whether a beacon of a service coverage area that supports a QoS used by the MS is detected, information indicating whether a signal strength of the beacon is greater than or equal to a predetermined threshold value when the beacon is detected, information indicating whether a signal of the serving BS is received well, and the like may be included.

In operation 212, the serving BS 100 determines whether a measurement report is received from the MS 105 for which DC is set up at predetermined periods. When the determination shows that the measurement report is not received, the serving BS 100 proceeds with operation A and waits for the reception of the measurement report. Here, operation A is defined to be the state in which the DC of the MS 105 is set up.

When the determination shows that the measurement report is received from the MS 105 for which the DC is set up, the serving BS 100 determines, for example, whether the QoS used by the MS 105 is supported based on the measurement report, and whether the handover condition is satisfied based on the signal strength of the beacon, in operation 214. In particular, when the serving BS 100 determines, based on the measurement report, that the beacon that the MS 105 receives may support the QoS used by the MS 105 and the signal strength of the beacon is greater than or equal to the handover reference threshold value, the serving BS 100 determines that the handover condition is satisfied in operation 214. When the determination shows that the handover condition is satisfied in operation 214, the serving BS 100 determines a neighboring BS that transmits the QoS supportable beacon to be the target BS, and executes a handover in operation 216. In operation 218, the serving BS 100 removes the DC of the MS 105. Here, the handover reference threshold value is defined to be a minimum threshold value of a signal strength for providing a service to an MS.

When the determination made in operation 214 shows that the beacon is received, but a beacon corresponding to a service coverage area that provides the QoS used by the MS is not received, the serving BS 100 proceeds with operation 220. In operation 220, the serving BS 100 determines whether the signal strength of the beacon is greater than or equal to a first threshold value. The first threshold value is defined to be a threshold value of a signal strength set for determining whether entry of the MS 105 into the service coverage area of the neighboring BS that transmits the beacon is close. When the determination shows that the signal strength of the beacon is greater than or equal to the first threshold value, the serving BS 100 determines that the entry of the MS 105 into the service coverage area of the neighboring BS that transmits the beacon is close, and proceeds with operation 222. In operation 222, the serving BS 100 sets the current length of a period of a measurement report of the MS 105 to a minimum value. In operation 224, the serving BS 100 copies and transmits real-time data for data service to the neighboring BS, and returns to operation A.

When the determination made in operation 220 shows that the signal strength of the current beacon received in the current period is less than the first threshold value, the serving BS 100 determines whether the signal strength of the current beacon is at least a predetermined offset greater than the signal strength of a previous beacon received in a previous period, in operation 226. When the determination shows that the signal strength of the current beacon is at least the offset greater than the signal strength of the previous beacon, the serving BS 100 determines that the entry of the MS 105 into the service coverage area of the neighboring BS that transmits the current beacon is close, and proceeds with operation 228. In operation 228, the serving BS 100 decreases the current length of the period of measurement report of the MS 105 by a predetermined unit. In this instance, the decreased current length may be set to a value greater than the minimum value.

When the determination made in operation 226 shows that the signal strength of the current beacon is not at least the offset greater than the signal strength of the previous beacon, the serving BS 100 proceeds with operation 230. In operation 230, the serving BS 100 determines whether the signal strength of the current beacon is at least the offset less than the signal strength of the previous beacon. When the determination shows that the signal strength of the current beacon is at least the offset less than the signal strength of the previous beacon, the serving BS 100 increases the current length of the period of measurement report of the MS by the predetermined unit in operation 232. Therefore, when the MS 105 detects a beacon that is capable of supporting a QoS, the serving BS 100 according to an embodiment of the present disclosure may execute a control for prompt report of the same.

When the determination made in operation 230 shows that the signal strength of the current beacon is not at least the offset less than the signal strength of the previous beacon, the serving BS 100 determines whether the signal strength of the current beacon is less than a second threshold value in operation 234. The second threshold value may be defined to be a signal strength for determining a minimum possibility of a handover of the MS 105 to the neighboring BS that transmits the current beacon. When the determination shows that the signal strength of the current beacon is greater than or equal to the second threshold value, the serving BS 100 returns to operation A. When the signal strength of the current beacon is less than the second threshold value, the serving BS 100 determines that the possibility of the handover of the MS 105 to the neighboring BS that transmits the current beacon is zero, returns to operation 218, and removes the DC of the MS 105. Therefore, the MS that receives a signal strength that is greater than or equal to the first threshold value, and less than the second threshold value may adjust the current length of the period of a measurement report through the above described processes.

Figure 3:
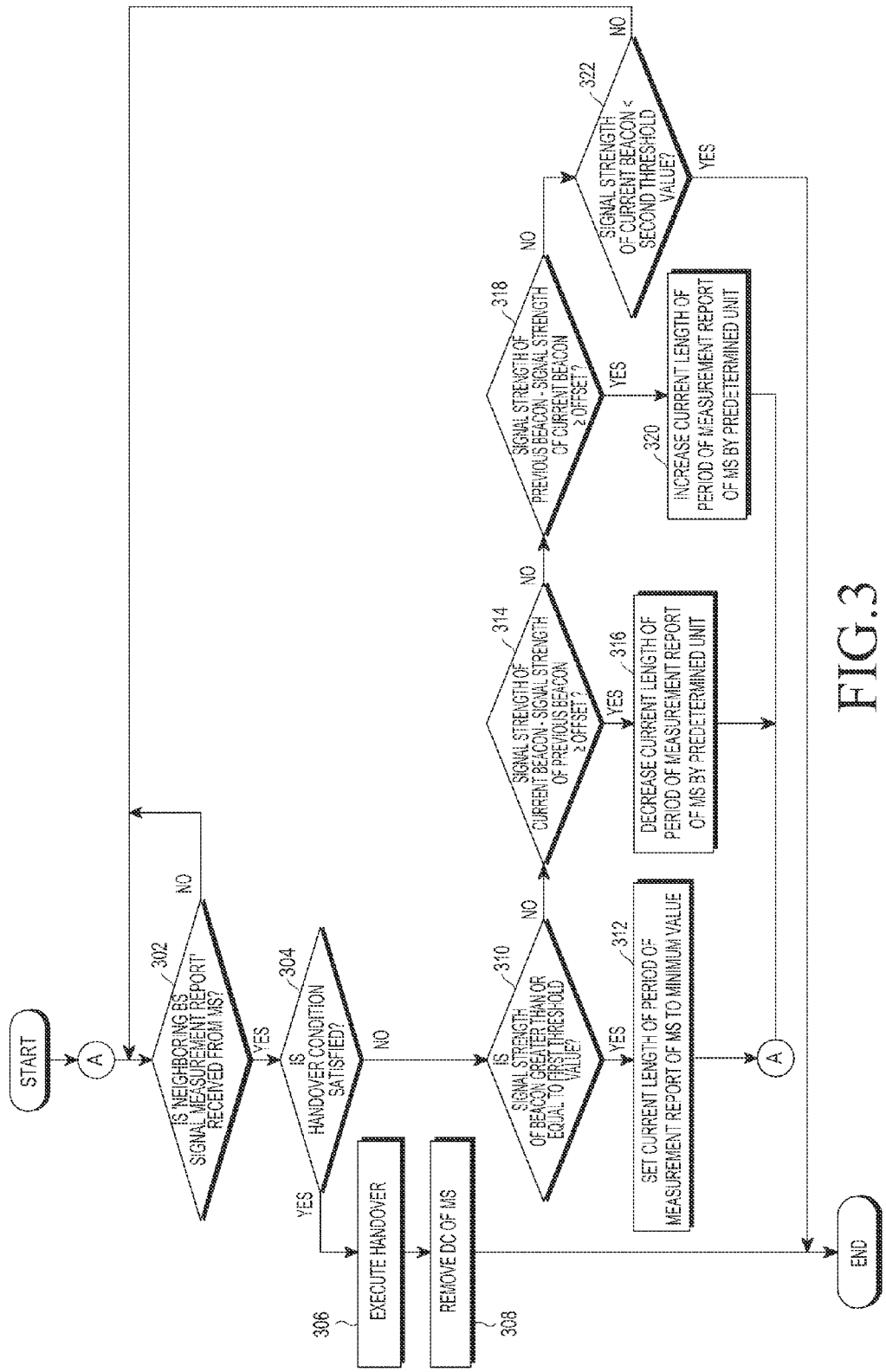
FIG. 3 is an example of a flowchart of operations of a target BS according to an embodiment of the present disclosure.

FIG. 3 is a flowchart of operations of a target BS according to an embodiment of the present disclosure. For ease of description, it is assumed that a target BS is the small BS 110 of FIG. 1 based on the communication system of FIG. 1.

Referring to FIG. 3, it is assumed that the target BS 110 maintains operation A which is the state in which the DC is set up with respect to an MS, together with a serving BS. In operation 302, the target BS 110 determines whether a measurement report is received from the MS with which the target BS 110 sets up the DC, at predetermined periods. Here, as described in FIGS. 2A and 2B, it is assumed that the format that is communicated when the serving BS 100 sets up the DC of the MS is applied to the measurement report. When the determination shows that the measurement report is not received, the serving BS 100 proceeds with operation A and waits for reception of the measurement report.

When the determination shows that the measurement report is received from the MS for which DC is set up, the target BS 110 determines, for example, whether a handover condition is satisfied based on the measurement report in operation 304. In particular, the handover condition in the embodiment of FIG. 3 may be set to be the case in which signal strength information of a beacon that the MS receives is greater than or equal to a handover reference threshold value, and the QoS used by the MS is supported. Here, the handover reference threshold value is defined to be a minimum threshold value of a signal strength for providing a service to an MS.

When the determination shows that the handover condition is satisfied based on the measurement report, the target BS 110 hands over the MS to itself in operation 306, and the target BS 110 removes the DC of the MS in operation 308. In this example, the removal of the DC of the MS may be executed when the target BS 110 transmits a signal indicating the removal of the DC to the serving BS 100.

When the determination made in operation 304 shows that the handover condition is not satisfied based on the measurement report, the target BS 110 proceeds with operation 310. In operation 310, the target BS 110 determines whether the signal strength of the beacon is greater than or equal to a first threshold value. The first threshold value is defined to be identical to the first threshold value of FIGS. 2A and 2B and thus, a detailed description thereof will be omitted to avoid duplicate descriptions. When the determination shows that the signal strength of the beacon is greater than or equal to the first threshold value, the target BS determines that entry of the MS into the service coverage area of the target BS is close. Therefore, the target BS 110 sets the current length of a period of a measurement report of the MS to a minimum value in operation 312, and thereafter enters operation A. Therefore, when a beacon that is capable of supporting the QoS used by the MS is received and the signal strength of the beacon is greater than or equal to the threshold value, or when a signal from the serving BS is not received, the target BS 110 immediately enters into the state of executing a handover. Subsequently, the target BS 110 removes the DC with respect to the MS, and transmits a signal associated with the same to the serving BS 100.

When the determination made in operation 310 shows that the signal strength of the current beacon received in the current period is less than the first threshold value, the target BS 110 determines whether the signal strength of the current beacon is at least a predetermined offset greater than the signal strength of a previous beacon received in a previous period, in operation 314. When the determination shows that the signal strength of the current beacon is at least the offset greater than the signal strength of the previous beacon, the target BS 110 determines that entry of the MS into the service coverage area of itself is close, and proceeds with operation 316. In operation 316, the target BS 110 decreases the current length of the period of the measurement report of the MS 105 by a predetermined unit. In this instance, the decreased current length may be set to a value greater than the minimum value.

When the determination made in operation 314 shows that the signal strength of the current beacon is not at least the offset greater than the signal strength of the previous beacon, the target BS 110 determines whether the signal strength of the current beacon is at least offset less than the signal strength of the previous beacon in operation 318. When the determination shows that the signal strength of the current beacon is at least the offset less than the signal strength of the previous beacon, the target BS 110 increases the current length of the period of the measurement report of the MS by the predetermined unit in operation 320. Therefore, when the MS detects a beacon that is capable of supporting the QoS used by the MS, the target BS 110 executes a control for prompt report of the same.

When the determination made in operation 318 shows that the signal strength of the current beacon is not at least the offset less than the signal strength of the previous beacon, the target BS 110 determines whether the signal strength of the current beacon is less than a second threshold value in operation 322. The second threshold value is defined to be identical to the second threshold value of FIGS. 2A and 2B and thus, detailed descriptions thereof will be omitted to avoid duplicate descriptions.

When the determination shows that the signal strength of the current beacon is greater than or equal to the second threshold value, the serving BS returns to operation A. When the signal strength of the current beacon is less than the second threshold value, the serving BS determines that the possibility of the handover of the MS to the neighboring BS that transmits the current beacon is zero, returns to operation 308, and removes the DC of the MS. Therefore, the MS that receives a signal strength that is greater than or equal to the first threshold value, and less than the second threshold value, may adjust the current length of the period for the measurement report through the above described processes.

Figure 4:
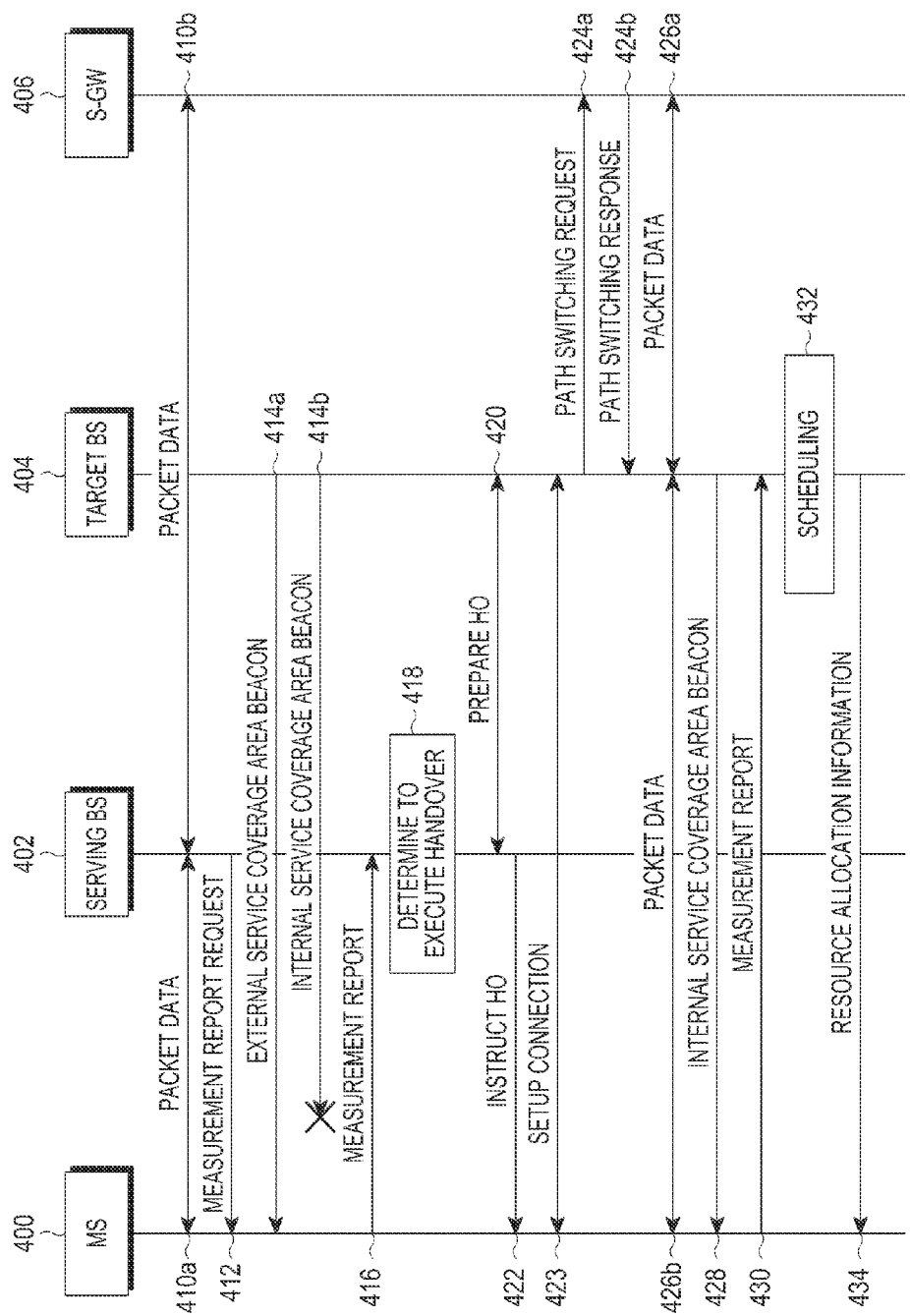
FIG. 4 is an example of a signal flow diagram of case 1 of FIGS. 2A and 2B according to an embodiment of the present disclosure.

FIG. 4 is a signal flow diagram of case 1 of FIGS. 2A and 2B according to an embodiment of the present disclosure. Case 1 corresponds to the case in which an MS receives a beacon from a target BS that supports a plurality of service coverage areas, a handover condition is satisfied, and a handover is executed. Here, it is assumed that the handover condition is set to be the case in which the beacon of the service coverage area that the MS receives provides the service with the QoS used by the MS, as shown in operation 206 of FIGS. 2A and 2B.

Referring to FIG. 4, in operations 410a through 410b, a serving BS 402 transfers, to an MS 400, packet data obtained from a Serving Gate Way (S-GW) 406. Subsequently, in operation 412, the serving BS 402 transmits, to the MS 400, a measurement report request at predetermined periods.

In this example, it is assumed that the MS 400 moves to the service coverage area of a target BS 404 from the service coverage area of the serving BS 402. For ease of description, it is assumed that the target BS 404 is the small BS 110 in the millimeter wave communication system of FIG. 1. The small BS 110 broadcasts different beacons respectively corresponding to the internal service coverage area 115 and the external service coverage area 120, as illustrated in FIG. 1. The MS 400 may or may not receive corresponding beacons, depending on a current location. For example, it is assumed that the MS 400 is located in the external service coverage area of the target BS 404. Accordingly, the MS 400 receives an external service coverage area beacon broadcasted by the target BS 404 in operation 414a, whereas the MS 400 fails to receive an internal service coverage area beacon transmitted by the target BS in operation 414b. Therefore, the MS 400 generates a measurement report associated with the received external service coverage area beacon and transmits the measurement report to the serving BS 402, in operation 416.

Then, the serving BS 420 determines, based on the measurement report received from the MS 400, whether a handover condition is satisfied, and determines whether to execute a handover, in operation 418. In this example, it is assumed that the handover condition is set to be the case in which the external service coverage area beacon supports the QoS used by the MS 400. FIG. 4 assumes that the small base station 110 of FIG. 1 is the target BS 404 and thus, the serving BS 402 determines that a handover with the target BS 404 which has a different RAT from the serving BS 402, that is, a handover with the target BS 404 which corresponds to a wireless LAN BS, requires switching an RAT. As another example, when a beacon that the MS 400 receives as a target of the measurement report corresponds to one of the beacons that respectively correspond to a plurality of frequency bands supported by a single communication system, the serving BS 420 determines whether to change a serving frequency band to a frequency band corresponding to the beacon through resource allocation. The serving BS 402 executes a preparation process for a handover with the target BS 404 in operation 420, and transfers, to the MS 400, a handover command to handover to the target BS 404, in operation 422. Accordingly, the connection between the MS 400 and the target BS 404 is set up in operation 423. In operation 424a, the target BS 404 transmits, to the S-GW 406, a path switching request for requesting switching of a path of packet data of the MS 400 that has been transferred to the serving BS 402, to the target BS 404. Then, in response to the path switching request, the S-GW 406 transfers a path switching response to the target BS 404 in operation 424b, the packet data of the MS 400 is transferred to the MS 400 through the target BS 404 in operations 426a through 426b.

Subsequently, it is assumed that the MS 400 receives the internal service coverage area beacon of the target BS 404 in operation 428, due to the movement of the MS 400. In operation 430, the MS 400 transfers, to the target BS 404, a measurement report associated with the internal service coverage area beacon. In operation 432, the target BS 404 recognizes that the MS 400 enters into the internal service coverage area of the target BS 404, and executes scheduling for providing a service through the internal service coverage area. In operation 434, the target BS 404 transfers, to the MS 400, resource allocation information obtained through scheduling.

Figure 5A:
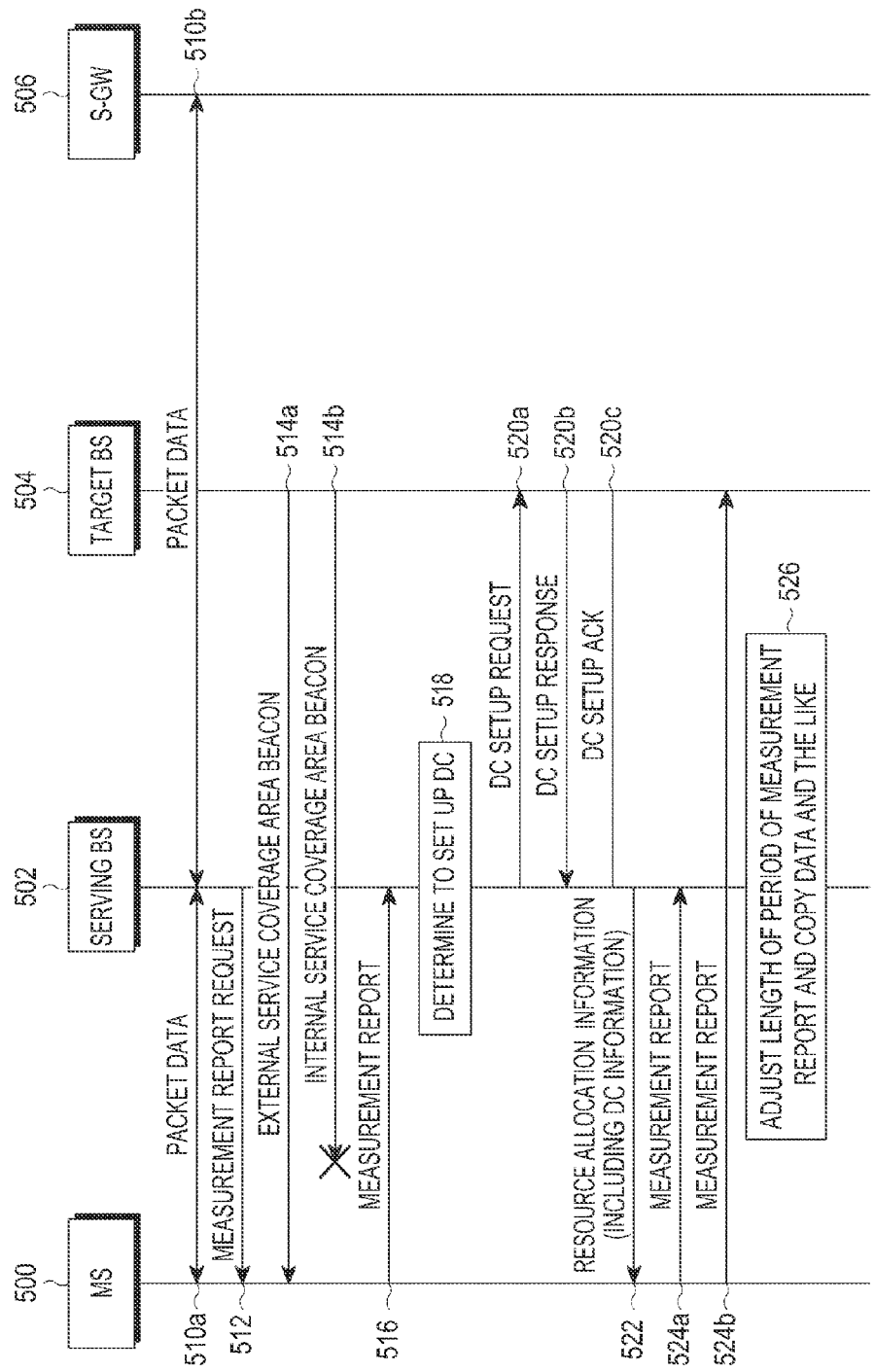
FIGS. 5A and 5B are examples of a signal flow diagram of case 2 of FIGS. 2A and 2B according to an embodiment of the present disclosure.
Figure 5B:
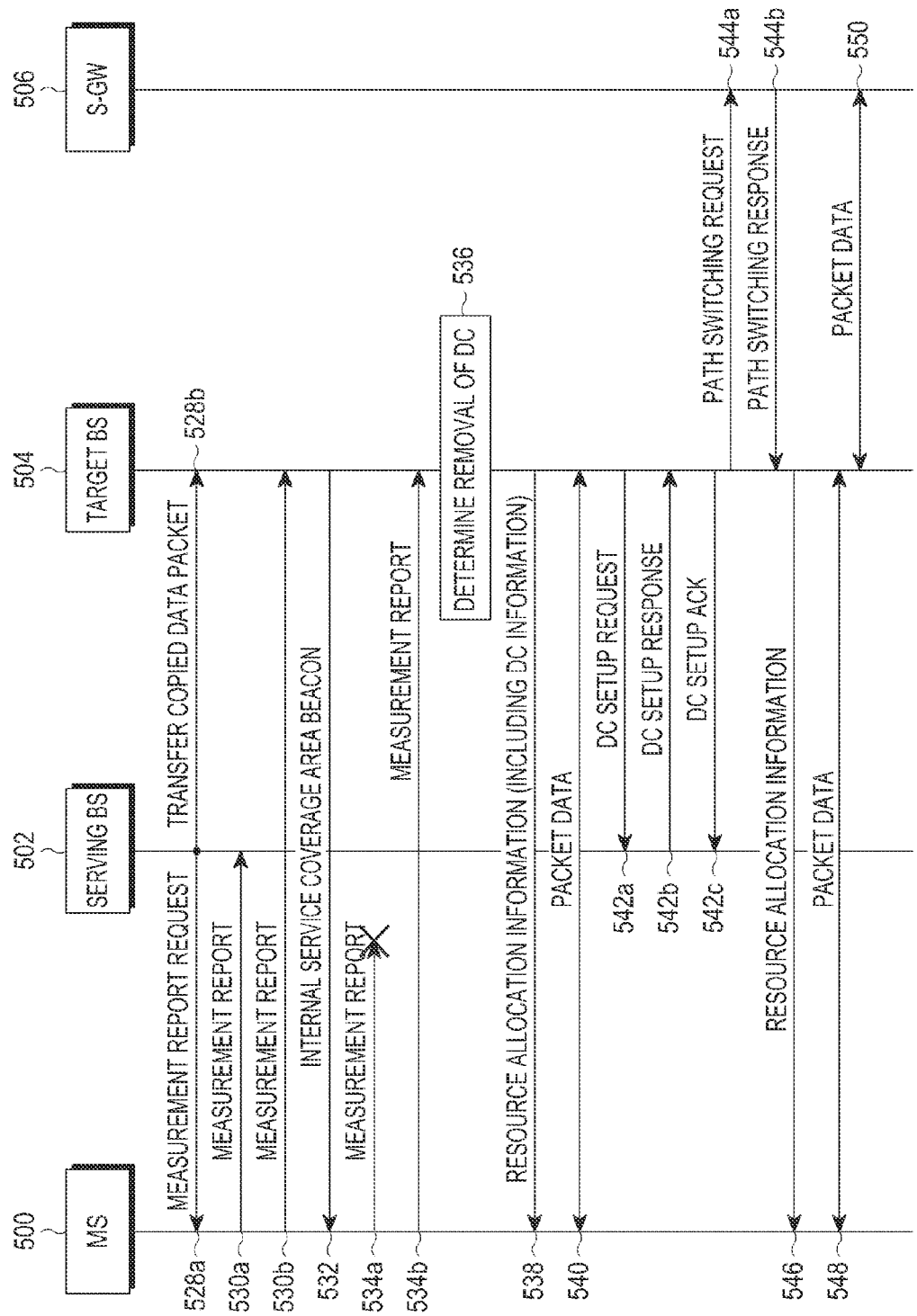

FIGS. 5A and 5B are examples of a signal flow diagram of case 2 of FIGS. 2A and 2B according to an embodiment of the present disclosure. Case 2 according to an embodiment of the present disclosure corresponds to the case in which an MS receives a beacon from a target BS that supports a plurality of service coverage areas, a handover condition is not satisfied, and DC with the target BS is set up. Here, it is assumed that the handover condition is set to be identical to the handover condition of operation 206 of FIGS. 2A and 2B. The DC is defined to be identical to the DC of FIGS. 2A and 2B and thus, detailed descriptions thereof will be omitted to avoid duplicate descriptions. FIGS. 5A and 5B exemplify the case in which a single target BS that supports a plurality of service coverage areas is used.

Referring to FIG. 5A, in operations 510a through 510b, a serving BS 502 transmits and receives packet data between an S-GW 506 and an MS 500. Subsequently, in operation 512, the serving BS 502 transmits, to the MS 500, a measurement report request, at predetermined periods.

In the same manner as FIG. 1, it is assumed that the MS 500 moves to the service coverage area of a target BS 504 from the service coverage area of the serving BS 502. For ease of description, it is assumed that the target BS 504 is the small BS 110 in the millimeter wave communication system of FIG. 1. The small BS 110 broadcasts different beacons respectively corresponding to the internal service coverage area 115 and the external service coverage area 120, as illustrated in FIG. 1. The MS 500 may or may not transmit corresponding beacons, depending on a current location. For example, it is assumed that the MS 500 is located in the external service coverage area of the target BS 504. Accordingly, the MS 500 receives an external service coverage area beacon broadcasted by the target BS 504 in operation 514a, whereas the MS 500 fails to receive an internal service coverage area beacon transmitted by the target BS 504 in operation 514b. Therefore, the MS 500 generates only a measurement report associated with the received external service coverage area beacon and transmits the measurement report to the serving BS 502, in operation 516.

Then, the serving BS 502 determines, based on the measurement report received from the MS 500, whether to set up the DC with respect to the MS 500, in operation 518. In this example, it is assumed that it is determined to set up the DC with respect to the MS with the target BS 504, since it is recognized, based on the measurement report, that the beacon transmitted by the target BS 504 does not support the QoS used by the MS but the target BS supports another service coverage area that supports the QoS. Then, the serving BS 502 communicates information on resource allocation for communication for each of the serving BS 502 and the target BS 504. For example, the resource allocation may use a scheme that distinguishes the communication of the serving BS 502 and the communication of the target BS 504 through a time division scheme, a scheme of simultaneously executing the communication of the serving BS 502 and the communication of the target BS 504 based on different frequency bands or a radio frequency (RF) chain characteristic of a terminal, or the like. The serving BS 502 transmits, to the target BS 504, a DC connection request including information resource allocation information for the DC in operation 520a, and receives, from the target BS 504, a DC connection response in response to the DC connection request, in operation 520b. Subsequently, the serving BS 502 transmits, to the target BS 504, DC setup Ack indicating the reception of the DC connection response, in operation 520c. In operation 522, the serving BS 502 transfers, to the MS 500, resource allocation information for the DC. Through the above process, the MS 500 is in the state of having the DC set with the serving BS 502 and the target BS 504. Accordingly, when it is assumed that a period of a subsequent measurement report has come, the MS 500 transmits a measurement report to the serving BS 502 in operation 524a. In operation 524b, the MS 500 also transmits the measurement report to the target BS. Here, it is assumed that the measurement reports transmitted in operations 524a and 524b are identical, and the format determined in the resource allocation process for the DC is applied.

In operation 526, the serving BS 502 adjusts the current length of the period for the measurement report of the MS 500 based on the information obtained from the measurement report, and determines whether to copy data to be transferred to the target BS, or the like. In particular, as described in operation 214 of FIGS. 2A and 2B, when the strength of a beacon that the MS 500 receives is greater than or equal to the first threshold value, the current length is set to a minimum value, and real-time data to be transferred to the MS 500 is copied. When the strength of the beacon that the MS 500 receives is greater than or equal to the first threshold value and a difference between the signal strength of a beacon received in a previous period, and the signal strength of the beacon received in the current period is greater than or equal to a predetermined offset, the current length is set to be 1 stage shorter than the current length. When the difference is less than the offset, the current length may be set to be 1 stage longer than the current length.

Subsequently, referring to FIG. 5B, when a period corresponding to the adjusted current length has come, the serving BS 502 transfers a measurement report request to the MS 500 in operation 528a, and simultaneously, copies and transfers, to the target BS 504, real-time data to be transferred to the MS 500, in operation 528b.

Subsequently, in operations 530a and 530b, the MS 500 transfers a measurement report corresponding to a measurement report request of operation 528a to the serving BS 502 and the target BS 504, respectively.

It is assumed that the MS 500 continuously moves and enters into the internal service coverage area of the target BS 504. Accordingly, in operation 532, the MS 500 receives an internal service coverage area beacon broadcasted by the target BS 504. It is assumed that the internal service coverage area supports the QoS used by the MS 500. In operations 534a and 534b, the serving BS 502 transfers a measurement report associated with the internal service coverage area beacon to the serving BS 502 and the target BS 502, respectively. However, when it is assumed that the current location of the MS 500 is out of the service coverage area of the serving BS 502, the measurement report transmitted by the MS 500 in operation 534a may not be transferred to the serving BS 502.

Subsequently, in operation 536, the target BS 504 determines whether to remove the DC with the MS 500, based on the measurement report. That is, when the signal strength of a beacon obtained through the measurement report is less than the second threshold value, or when it is determined that the MS 500 is disconnected from the serving BS 502, removal of the DC is determined. In operation 538, the target BS 504 transfer, to the MS 500, resource allocation information including DC information instructing the MS 500 to receive packet data through only the target BS 504 due to the removal of the DC. Then, in operation 540, a handover is completed, and the MS 500 and the target BS 504 are available to communicate through the resource allocation information. The target BS 504 transfers, to the serving BS 502, a DC removal request for removing the DC set with the MS 500 in operation 542a, and receives a DC removal response from the target BS 504 in response to the DC removal request in operation 542b. In operation 542c, the target BS 504 transfers DC removal Ack in response to the reception of the DC removal response. In operation 544a, the target BS 504 transfers, to the S-GW 506, a path switching request for requesting switching of a path associated with the MS 500 from the serving BS 502 to the target BS 504. In operation 544b, the target BS 504 receives a path switching response through the S-GW 506, in response to the path switching request. In operation 546, the target BS 504 transfers, to the MS 500, resource allocation information obtained through the packet switching response. Subsequently, the target BS 504 transmits and receives the packet data to/from the MS 500 and the S-GW 506 using the resource allocation information through operations 548 through 550.

Figure 6:
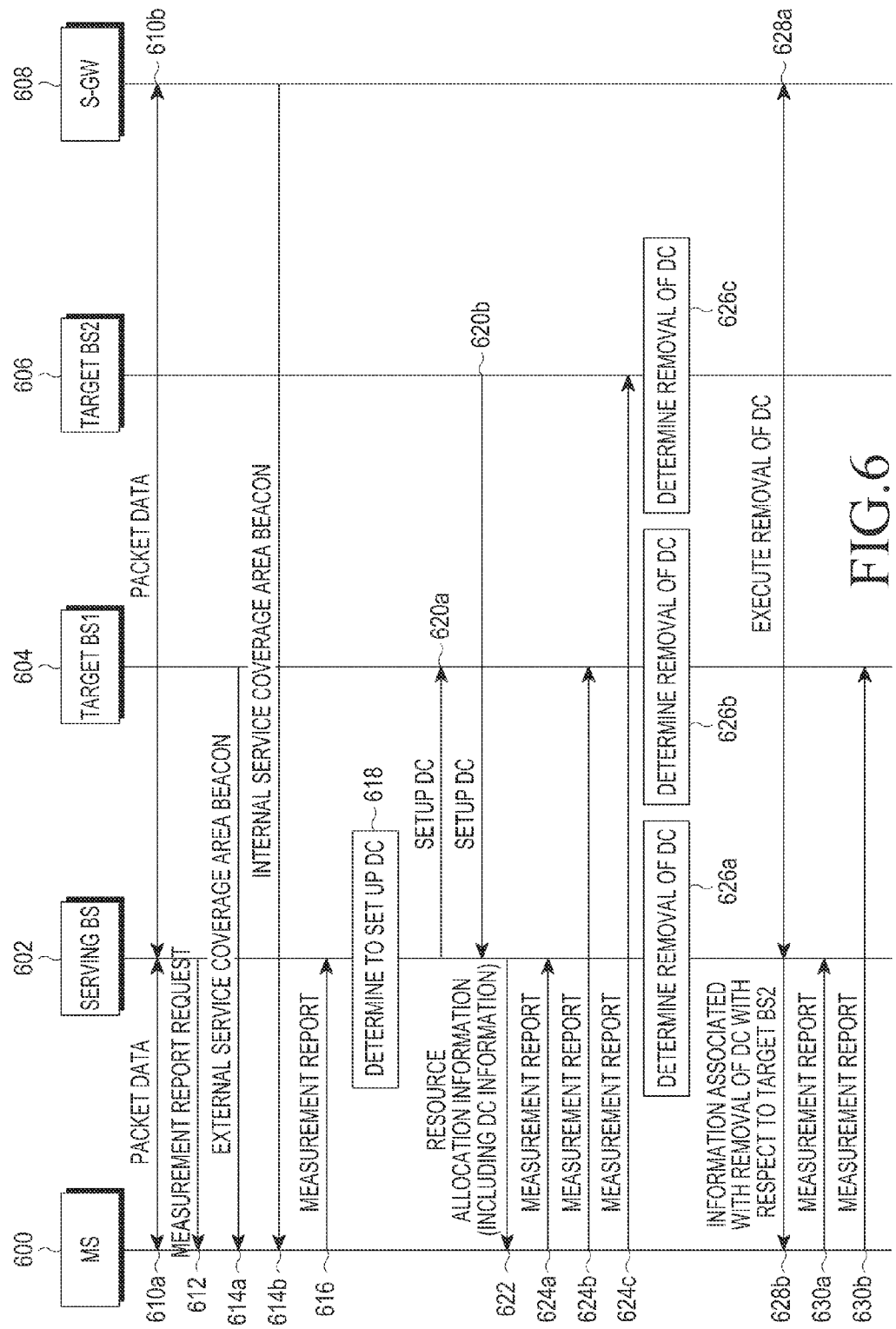
FIG. 6 is another example of a signal flow diagram of case 2 of FIGS. 2A and 2B according to an embodiment of the present disclosure.

FIG. 6 is another example of a signal flow diagram of case 2 of FIGS. 2A and 2B according to an embodiment of the present disclosure. Case 2 according to an embodiment of the present disclosure corresponds to the case in which an MS receives a beacon from a target BS that supports a plurality of service coverage areas, a handover condition is not satisfied, and DC with a target BS is set up. Here, the handover condition is set to be identical to the handover condition of operation 206 of FIGS. 2A and 2B. The DC is defined to be identical to the DC of FIGS. 2A and 2B and thus, detailed descriptions thereof will be omitted to avoid duplicate descriptions. The embodiment of FIG. 6 exemplifies the case in which two target BSs that support a plurality of service coverage areas are used. Although, for ease of description, the present specifications exemplifies the case in which one or two target BSs that support a plurality of service coverage areas are used, the present disclosure may be applied to the case in which a plurality of target BSs are used.

Referring to FIG. 6, in operations 610a through 610b, a serving BS 602 transmits and receives packet data between an S-GW 608 and an MS 600. Subsequently, in operation 612, the serving BS 602 transmits, to the MS 600, a measurement report request at predetermined periods.

In the same manner as FIGS. 5A and 5B, it is assumed that the MS 600 moves to the service coverage areas of a target BS1 604 and a target BS2 606 from the service coverage area of the serving BS 602. It is assumed that each of the target BS1 604 and the target BS2 606 broadcasts different beacons respectively corresponding to an internal service coverage area and an external service coverage area, in the same manner as the small BS 110 as shown in FIG. 1. The MS 600 may or may not transmit corresponding beacons, depending on a current location. For example, it is assumed that the MS 600 is located in the external service coverage area of the target BS1 604 and the external service coverage area of the target BS2 606. In this example, the external service coverage areas of the target BS1 604 and the target BS2 606 may be configured to partially overlap, or configured to be included in one another.

Accordingly, it is assumed that the MS 600 receives an external service coverage area beacon broadcasted by the target BS1 604 in operation 614a, and the MS 600 receives an external service coverage area beacon broadcasted by the target BS2 606 in operation 614b. Then, the MS 600 generates a measurement report associated with each external service coverage area beacon of the target BS1 604 and the target BS2 606, and transmits the generated measurement reports to the serving BS 602, in operation 616.

Then, the serving BS 602 determines, based on the measurement report received from the MS 600, whether to set up the DC with respect to the MS 600, in operation 618. In this example, it is assumed that the serving BS 602 recognizes, based on the measurement reports, that the MS 600 receives beacons of at least two target BSs that support a plurality of service coverage areas, and determines that the signal strengths of the beacons are greater than or equal to a handover reference threshold value. The serving BS 602 determines to set up DC with respect to the MS 600, with each of the target BS1 604 and the target BS2 606. The serving BS 602 generates a list of target BSs for which DC is set up (hereinafter referred to as a 'DC setup BS list'), including the target BS1 604 and the target BS2 606. Through operations 620a through 620b, DC with each of the target BS1 604 and the target BS2 606 is set up. In this example, the DC setup process includes a process of transferring the DC setup BS list to a corresponding target BS. In addition, the DC setup process may also include a process of communicating information on resource allocation for communication with each of the target BS1 604 and the target BS2 606. Examples of the communication have been provided in the descriptions associated with FIGS. 5A and 5B, detailed descriptions thereof will be omitted to avoid duplicate descriptions. In operation 622, the serving BS 602 transfers, to the MS 600, resource allocation information for the DC of the DC setup process. Through the above process, the MS 600 is in the state of having the DC set with the serving BS 602 and the target BS1 604, and having the DC set with the serving BS 602 and the target BS 2 606. Accordingly, when it is assumed that the subsequent period of a measurement report has come, the MS 600 transmits a measurement report to the serving BS 602 and each of the target BS1 604 and the target BS2 606, in operations 624a through 624c. Here, it is assumed that the measurement reports transmitted in operations 624a and 624b are identical, and the format determined in the resource allocation process for the DC is applied. Subsequently, each of the serving BS 602, the target BS1 604, and the target BS2 606 determines whether to remove the DC with respect to the MS 600, through the measurement reports received from the MS 600, in operations 626a through 626c. A corresponding BS that determines removal of the DC informs all of the BSs having the DC with the MS 600 of the removal of the DC of itself. For example, it is assumed that the serving BS 602 recognizes, from the information obtained from the measurement report, that the target BS1 604 and the target BS2 606 simultaneously satisfy the handover condition of the MS 600. In operation 628a, the serving BS 602 executes a DC removal process for removing the DC with respect to the MS 600 with the target BS1 604 and the target BS2 606. Although not illustrated, in the DC removal process, the serving BS 602 transmits a DC removal message to each of the target BS1 604 and the target BS2 606. Each of the target BS1 604 and the target BS2 606 transmits additional information to the serving BS 602. Here, the additional information corresponds to load information of a corresponding BS, a signal strength with respect to the MS 600, and the like. When the additional information is the load information, the serving BS 602 determines to be a final target for the removal of DC, a BS having the lowest load based on load information of the target BS1 604 and the target BS2 606. In the same manner, when the additional information is the signal strength, the serving BS 602 determines a BS having the highest signal strength among the target BS1 604 and the target BS2 606 to be a final target for the removal of DC. It is assumed that the serving BS 602 determines to remove the DC with the target BS2 606 when the load or the signal strength of the target BS2 606 is lower or higher than the load or the signal strength of the target BS1 604, and executes the removal of the DC. Although not illustrated, the target BS2 602 of which the DC is removed reports the removal of the DC of itself to the target BS1 604 and the serving BS 602 that is associated with the DC of the MS 600. In operation 628b, the serving BS 602 informs the MS 600 of the removal of the DC with the target BS2 606.

Then, the MS 600 is in the state of having the DC set with only the target BS1 604. Accordingly, in operations 630*a* through 630*b*, the MS 600 transfers a measurement report to each of the serving BS 602 and the target BS1 604.

Here, it is exemplified that a serving BS determines the removal of DC when the DC is set up through a plurality of BSs. However, all of the target BSs for which the DC is set up receive measurement reports from an MS and thus, they may determine removal of DC of themselves through the measurement reports.

Figure 7:
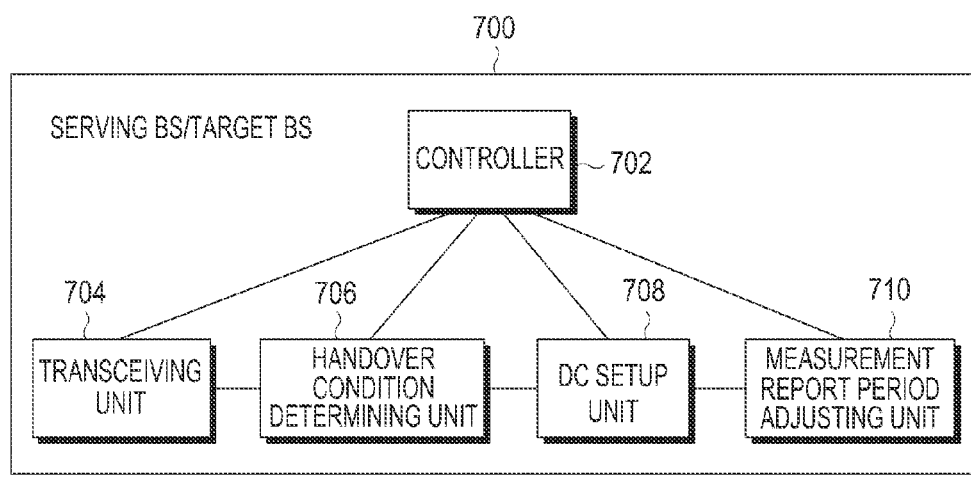
FIG. 7 is an example of a block diagram of a serving BS and a target BS according to an embodiment of the present disclosure.

FIG. 7 is an example of a block diagram of a serving BS and a target BS according to an embodiment of the present disclosure.

Referring to FIG. 7, each of a serving BS and a target BS 700 includes a controller 702, a transceiving unit 704, a handover condition determining unit 706, a DC setup unit 708, and a measurement report period adjusting unit 710. The configuration of a BS in FIG. 7 is separately illustrated for each operation according to an embodiment of the present disclosure, and may be configured differently based on the intention of a provider or the situation.

First, when the configuration of FIG. 7 operates as a serving BS, the controller 701 waits for reception of a measurement report of an MS in association with a beacon that supports a plurality of service coverage areas through the transceiving unit 704. When it is recognized that the measurement report is received, the controller 704 controls the handover condition determining unit 706 to determine whether the handover condition is satisfied based on the measurement report. Accordingly, the handover condition determining unit 706 compares the signal strength of the beacon with a handover reference threshold value, and determines whether a target BS that transmits the beacon supports the QoS used by the MS. When the signal strength of the beacon is greater than or equal to the handover reference threshold value and the QoS used by the MS is supported, it is determined that the handover condition is satisfied. Then, the controller 702 determines to execute the handover of the MS with the target base station.

Also, although the handover condition with respect to the MS is not satisfied, the controller 702 determines that the QoS may be provided when the MS arrives at another service coverage area of the serving BS of the communication system. Accordingly, the controller 702 determines that the handover condition is not satisfied and determines to set up the DC. A process of communicating information for the DC is executed. The communication includes a format associated with a measurement report of an MS which is transmitted after the DC is set up, and resource allocation for communication between a target BS and the MS, and communication between a serving BS and the MS. Detailed examples thereof have been provided earlier and thus, detailed descriptions thereof will be omitted to avoid duplicate descriptions.

When the signal strength of the beacon is greater than or equal to the handover reference threshold value, the DC setup unit 708 informs the controller 702 of the same, and determines to remove the DC. The controller 702 hands over the MS to the target base station, and removes the DC with the target BS.

After setup of the DC as per the instruction from the controller 702, the measurement report period adjusting unit 710 compares the signal strength of the beacon obtained from a measurement report received through the transceiving unit 704 with a first threshold value. When a comparison result shows that the signal strength of the beacon is greater than the first threshold value, the measurement report period adjusting unit 710 sets the current length of the measurement report to a minimum value. The controller 702 transmits a measurement report request to the MS at periods corresponding to the minimum value. When the signal strength of the beacon is greater than or equal to the first threshold value and the difference between the signal strength of a previously received beacon and the signal strength of the beacon is greater than or equal to a predetermined offset, the controller 702 sets the current length to be 1 stage shorter than the current length. Also, when the difference is less than the offset, the current length may be set to be 1 stage longer than the current length. When it is determined that the difference is less than the offset, or the signal strength of the beacon is less than a second threshold value, the controller 702 remove the DC.

In the same manner, when the configuration of FIG. 7 operates as a target BS, in the state of having the DC with respect to the MS, the transceiving unit 704 simultaneously receives data transmitted to the MS in real time through the serving BS. The handover condition determining unit 706, the DC setup unit 708, and the measurement report period adjusting unit 710 operate similarly to the operations of the serving BS and thus, detailed descriptions thereof will be omitted to avoid duplicate descriptions.

Figure 8A:
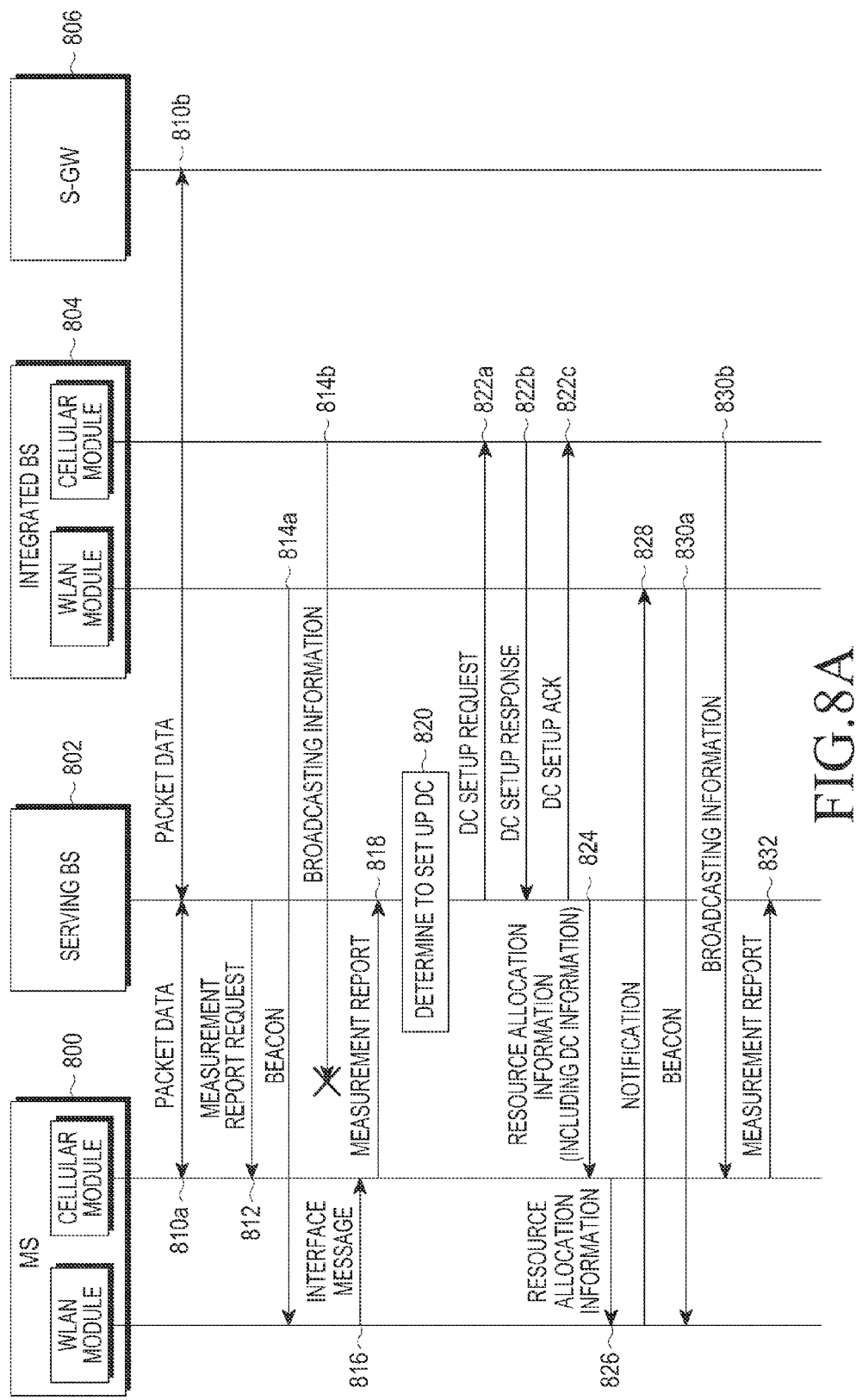
FIGS. 8A and 8B are examples of a signal flow diagram of Dual Connectivity (DC) according to an embodiment of the present disclosure.
Figure 8B:
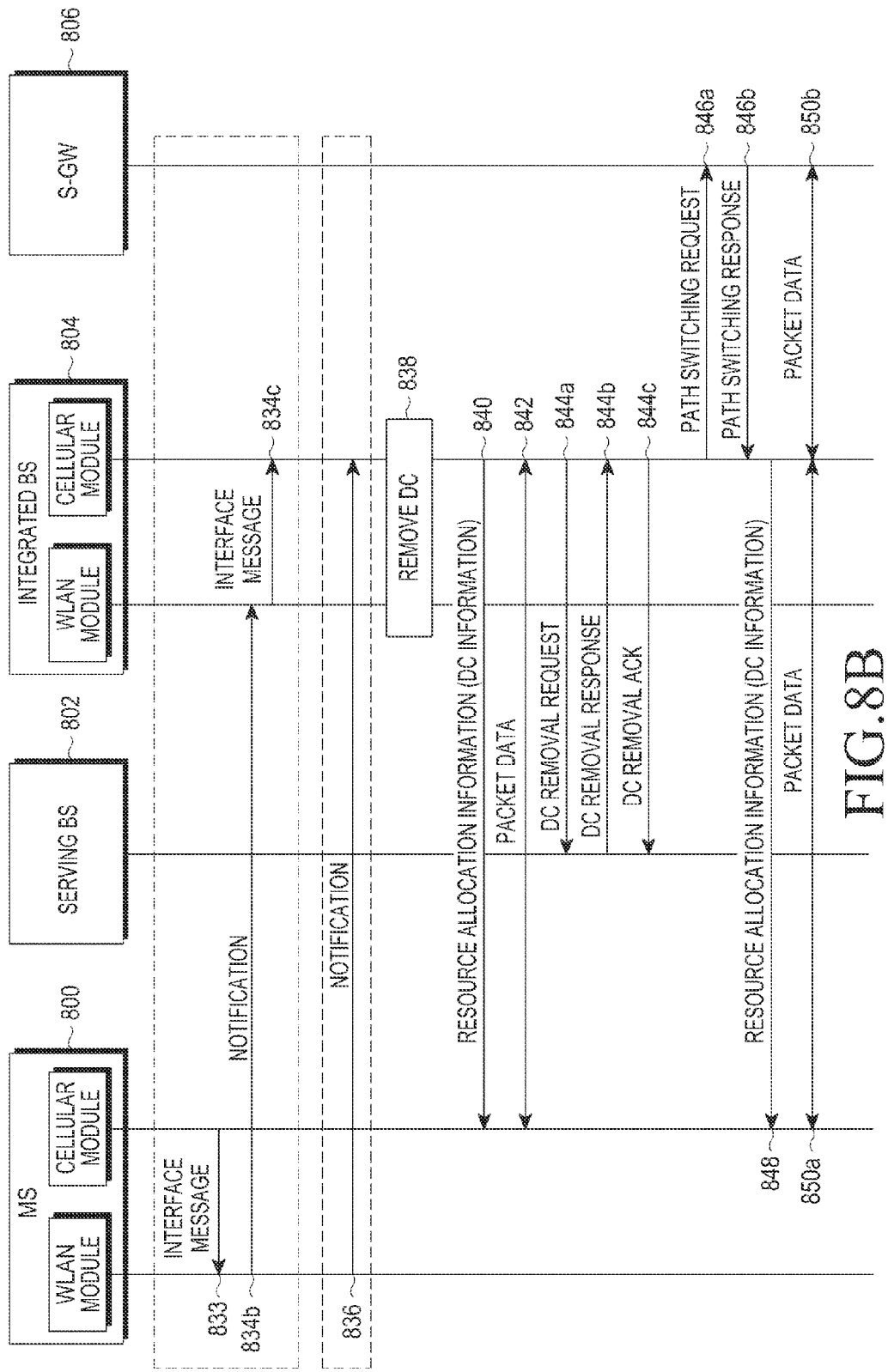

FIGS. 8A and 8B are examples of a signal flow diagram of DC according to an embodiment of the present disclosure.

Referring to FIGS. 8A and 8B, it is assumed that, for example, a target BS 804 is a BS integrated with a wireless LAN and a cellular BS. Accordingly, the target BS 804 includes a wireless module and a cellular module corresponding to service coverage areas that support different QoSs, and an MS 800 also includes a wireless LAN module and a cellular module. It is assumed that the QoS used by the MS 800 corresponds to a QoS supported by a service coverage area of a cellular module.

Referring to FIG. 8A, currently, the MS 800 transmits and receives packet data among the MS 800, a serving BS 802, and an S-GW 806, through the communication state with the serving BS 802, that is, in operations 810*a* through 810*b*. In operation 812, after receiving a measurement report request from the serving BS 802, the MS 800 receives a beacon of the wireless LAN module and broadcasting information of the cellular module transmitted from the integrated BS 804, in operations 814*a* through 814*b*. In this example, it is assumed that the broadcasting information of the cellular module is not received due to the location of the MS 800.

Then, the MS 800 recognizes reception of the beacon through its wireless LAN module, and transfers an interface message indicating the reception of the beacon to the cellular module in operation 816. The interface message is defined to be a message for interfacing between modules in the MS 800, that is, the wireless LAN module and the cellular module. In operation 818, the cellular module of the MS 800 generates a measurement report associated with the reception of the beacon and transmits the measurement report to the serving BS 802.

It is assumed that the serving BS 802 recognizes, based on the measurement report, that the beacon does not support the QoS of the MS but the integrated BS supports cellular communication that supports the QoS, and determines to set up DC with the integrated BS 804, in operation 820. In operation 822*a*, the serving BS 802 transfers a DC setup request to the integrated BS 804, and receives a DC setup response from the integrated BS 804 in operation 822*b*. In operation 822*c*, the serving BS 802 transfers, to the integrated BS 804, a DC Ack with respect to the reception of the DC setup response. In operations 822*a* through 822*c*, a process of communicating information for DC is executed, and this has been described earlier and thus, detailed descriptions thereof will be omitted to avoid duplicate descriptions. In operation 824, the serving BS 802 transfers, to the MS 800, resource allocation information including communicated DC information. In operation 826, the cellular module of the MS 800 transfers the resource allocation information to the wireless LAN module. In operation 828, the wireless LAN module of the MS 800 informs the wireless LAN module of the integrated BS 804 of the reception of the resource allocation information.

After the DC with respect to the MS 800 is set up, in operations 830*a* through 830*b*, the MS receives a beacon and broadcasting information of each of the wireless LAN module and the cellular module of the integrated BS 804. In this example, it is assumed that the MS 800 has moved to a location where the MS 800 is able to receive both the beacon and the broadcasting information. In this example, in operation 832 the cellular module of the MS 800 transfers a measurement report to the serving BS 802, and in operation 833, the cellular module of the MS 800 transfers the received broadcasting information to its wireless LAN module through an interface message. In operation 834*b*, the wireless LAN module of the MS 800 informs the wireless LAN module of the integrated BS 804 of the reception of the broadcasting information. In operation 834*c*, the wireless LAN module 804 transfers the notification to its cellular module through an interface message. Alternatively, in operation 836, the wireless LAN module of the MS 800 transfers the notification to the cellular module of the integrated BS 804, through a cellular radio interface using random access and the like.

Subsequently, in operation 838, the integrated BS 804 recognizes that the MS 800 is capable of receiving its broadcasting information and determines to remove the DC. In operation 840, the integrated BS 804 transmits, to the MS 800, resource allocation information including DC information instructing removal of the DC. When packet data received from the serving BS 802 through the DC state exists, the integrated BS 804 transmits and receives the packet data to/from the MS 800 in operation 842.

In operations 844*a* through 844*c*, the integrated BS 804 executes a process for removing the DC, and the corresponding process has been described earlier and thus, detailed descriptions thereof will be omitted to avoid duplicate descriptions. The integrated BS 804 transfers, to the S-GW 806, a path switching request for switching a path of packet data of the MS 800 from the serving BS 802 to the integrated BS 804, in operation 846*a*, and receives a path switching response in response to the request, in operation 846*b*. In operation 848, the integrated BS 804 transmits, to the MS 800, resource allocation information for packet data communication with the BS 804. Subsequently, based on the resource allocation information, in operations 850*a* through 850*b*, the cellular module of the MS 800, the cellular module of the integrated BS 804, and the S-GW transmit packet data.

Figure 9:
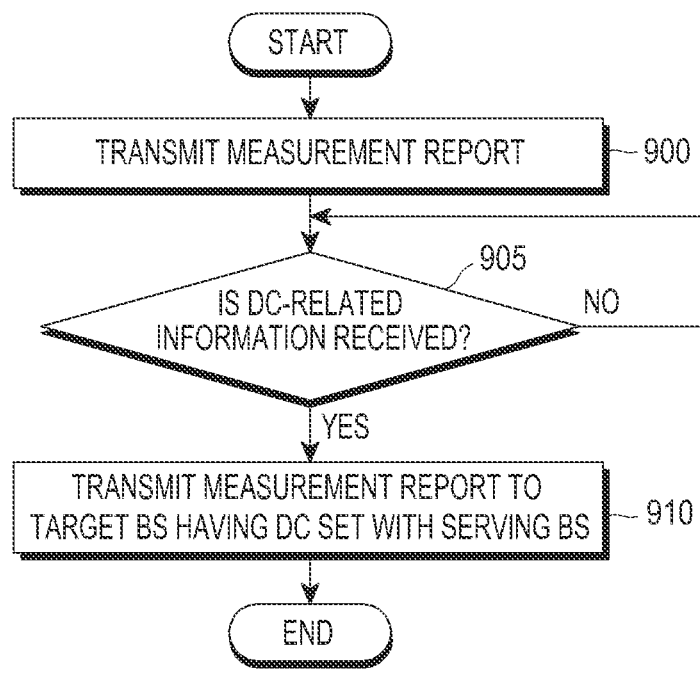
FIG. 9 is an example of a flowchart of operations of an MS according to an embodiment of the present disclosure.

FIG. 9 illustrates an example of a flowchart of operations of an MS according to an embodiment of the present disclosure.

Referring to FIG. 9, in operation 900, an MS generates a measurement report as per a measurement report request of a serving BS, and transmits the measurement report to the serving BS. In this example, according to an embodiment of the present disclosure, when the measurement report is beacon-related information associated with a beacon that supports a plurality of service coverage areas, the serving BS determines whether a handover condition is satisfied based on the beacon-related information. The handover condition has been described earlier and thus, detailed descriptions thereof will be omitted to avoid duplicate descriptions. It is assumed that the determination shows that the MS is unable to receive the QoS used by the MS in the current location, but the MS may be provided the QoS through another service coverage area of a target BS that transmits the beacon. The serving BS sets up the DC with respect to the MS with the target BS, copies real-time data to be transmitted to the MS, and simultaneously transmits the real-time data to the target BS. The serving BS has communicated information for the DC with the target BS, which has been described earlier and thus, detailed descriptions thereof will be omitted to avoid duplicate descriptions.

Subsequently, in operation 905, the MS determines whether information associated with DC is received from the serving BS. In this example, the DC-related information includes a format of a measurement report, to be transmitted to the serving BS and the target BS after the DC is set up, or resource-related information. When the determination shows that the DC-related information is not received, the MS continuously waits until it is received.

When the determination shows that the DC-related information is received, the MS transmits in operation 910, to each BS that has DC set with the serving BS, a measurement report based on a period and resources corresponding to the DC-related information.

Figure 10:
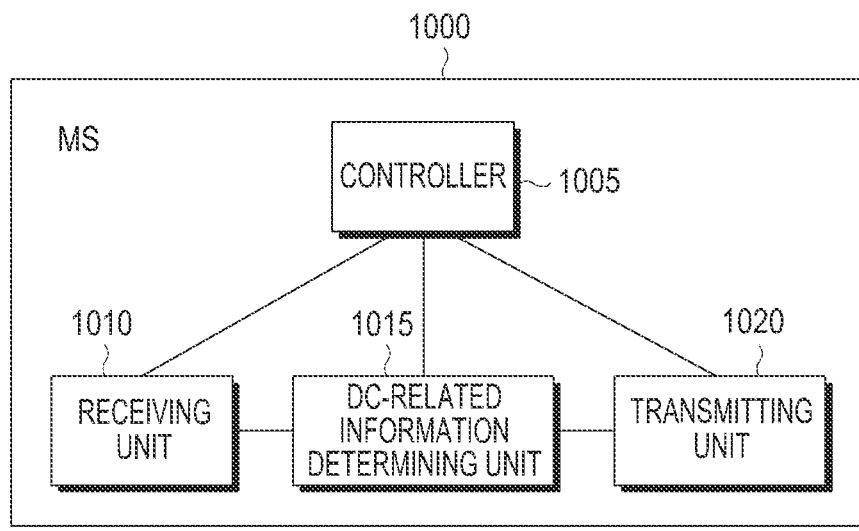
FIG. 10 is an example of a block diagram of an MS according to an embodiment of the present disclosure.

FIG. 10 illustrates an example of a block diagram of an MS according to an embodiment of the present disclosure.

Referring to FIG. 10, an MS 1000 includes a controller 1005, a receiving unit 1010, a DC-related information determining unit 1015, and a transmitting unit 1020. The configuration of an MS in FIGS. 8A and 8B are separately illustrated for each operation according to an embodiment of the present disclosure, and may be configured differently based on the intention of a provider or the situation.

The receiving unit 1010 receives a measurement report, packet data, and DC-related information, from a serving BS. When the controller 1005 recognizes reception of the DC-related information, the DC-related information determining unit 1015 determines a target BS for which the DC is set, resources to be allocated, a format of a measurement report transmitted after the DC is set up, or the like. The controller 1005 controls the transmitting unit 1020 to transmit a measurement report to the target BS and the serving BS, for which the DC is set up after the DC is set up based on the determined information.

That is, all configurations or steps of the operations illustrated in FIGS. 1 to 10 should not be interpreted as essentially structural elements for carrying out the present disclosure, and variations and modifications of the present disclosure may be implemented without departing from the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for a handover by a serving base station in a communication system, the method comprising:
   receiving, from a terminal, a first measurement of a target base station located within a coverage of the serving base station;

determining whether the first measurement satisfies a handover condition;

if the first measurement does not satisfy the handover condition, transmitting, to the target base station, a request for establishing a connection between the terminal and the target base station based on the first measurement; and if a response of the request is received from the target base station, transmitting, to the terminal, information indicating the connection is established.

2. The method of claim 1, further comprising:
receiving, from the terminal, a second measurement of the connection; and
adjusting a report period of the second measurement based on the received second measurement.

3. The method of claim 1,
wherein the first measurement comprises a measurement value of a signal among signals corresponding to at least two coverage served by the target base station, and
wherein each of the at least two coverage is different.

4. The method of claim 1, wherein the
handover condition is satisfied if a service coverage corresponding to a signal obtained from the first measurement supports a service having a service quality required by the terminal.

5. The method of claim 1, wherein the
information further comprises a report period for a second measurement of the connection, which is determined based on a resource allocated to the connection.

6. A method for a handover by a target base station in a communication system, the method comprising:
transmitting a signal corresponding to each of at least two coverage served by the target base station, which is located within a coverage of a serving base station;
receiving, from the serving base station, a request for establishing a connection with a terminal, wherein the request is determined based on a first measurement of the signal by the terminal;
transmitting, to the serving base station, a response of the request;
if an acknowledgement of the response is received from the serving base station, receiving, from the terminal, a second measurement of the connection; and
determining whether releasing of the connection is performed.

7. The method of claim 6, wherein the releasing of the connection is determined by:
transmitting, to the terminal, information indicating the releasing of the connection; and
transmitting, to the serving base station, a request for the releasing of the connection.

8. The method of claim 7, wherein, if a response to the request for the releasing is received from the serving base station, the method further comprises:
transmitting, to a serving gateway, a path switching request;
if a response of the path switching request is received from the serving gateway, transmitting, to the terminal, resource information of packet data obtained from the response of the path switching request; and
transmitting, to the terminal, the packet data based on the resource information.

9. A method for a handover by a terminal in a communication system, the method comprising:
receiving, from a target base station, a signal among signals corresponding to at least two coverage served by the target base station, which is located within a coverage of a serving base station;
transmitting, to the serving base station, a first measurement of the signal;
receiving, from the serving base station, information indicating whether a connection between the terminal and the target base station is established; and
transmitting, to the target base station, a second measurement on the connection based on the information.

10. The method of claim 9,
wherein the connection is established if the first measurement does not satisfy a handover condition,
wherein the handover condition is satisfied if a service coverage corresponding to the signal supports a service having a service quality required by the terminal.

11. A serving base station for a handover of a terminal in a communication system, the serving base station comprises:
a transceiver configured to receive from the terminal, a first measurement of a target base station located within a coverage of the serving base station; and
a processor configured to:
determine whether the first measurement satisfies a handover condition,
if the first measurement does not satisfy the handover condition, control the transceiver to transmit, to the target base station, a request for establishing a connection between the terminal and the target base station based on the first measurement, and
if a response of the request is received from the target base station, control the transceiver to transmit, to the terminal, information indicating the connection is established.

12. The serving base station of claim 11, wherein if the transceiver receives from the terminal, a second measurement of the connection, the processor is further configured to adjust a report period of the second measurement based on the received second measurement.

13. The serving base station of claim 11,
wherein the first measurement comprises a measurement value of a signal among signals corresponding to at least two coverage served by the target base station, and
wherein each of the at least two coverage is different.

14. The serving base station of claim 11, wherein the handover condition is satisfied if a service coverage corresponding to a signal obtained from the first measurement supports a service having a service quality required by the terminal.

15. The serving base station of claim 11, wherein the information further comprises a report period for a second measurement of the connection, which is determined based on a resource allocated to the connection.

16. A target base station for a handover in a communication system, the target base station comprising:
a transceiver configured to:
receive a signal corresponding to each of at least two coverage served by the target base station, which is located within a coverage of a serving base station,
receive, from the serving base station, a request for establishing a connection between a terminal, the request being determined based on a first measurement of the signal by the terminal,
transmit, to the serving base station, a response of the request, if an acknowledgement of the response is received from the serving base station, and
receive, from the terminal, a second measurement of the connection; and a processor configured to determine whether releasing of the connection is performed.

17. The target base station of claim 16, wherein, if releasing of the connection is determined, the transceiver is further configured to:
   transmit, to the terminal, information indicating the releasing of the connection, and
   transmit, to the serving base station, a request for the releasing of the connection.

18. The target base station of claim 16, the transceiver is further configured to:
   if a response of the request for the releasing is received from the serving base station, transmit, to a serving gateway, a path switching request, and
   if a response of the path switching request is received from the serving gateway, transmit, to the terminal, resource information of packet data obtained from the response of the path switching request, and transmit, to the terminal, the packet data based on the resource information.

19. A terminal for a handover in a communication system, the terminal comprising:
   a transceiver configured to receive, from a target base station, a signal among signals corresponding to at least two coverage served by the target base station, which is located within a coverage of a serving base station,
   a processor configured to:
      generate a first measurement of the signal, and
      control the transceiver to:
         transmit, to the serving base station, a first measurement of the signal,
         receive, from the serving base station, information indicating whether a connection between the terminal and the target base station is established, and
         transmit, to the target base station, a second measurement on the connection based on the information.

20. The terminal of claim 19,
   wherein the connection is established if the first measurement does not satisfy a handover condition, and
   wherein the handover condition is satisfied if a service coverage corresponding to the signal supports a service having a service quality required by the terminal.

* * * * *